Figure 1:
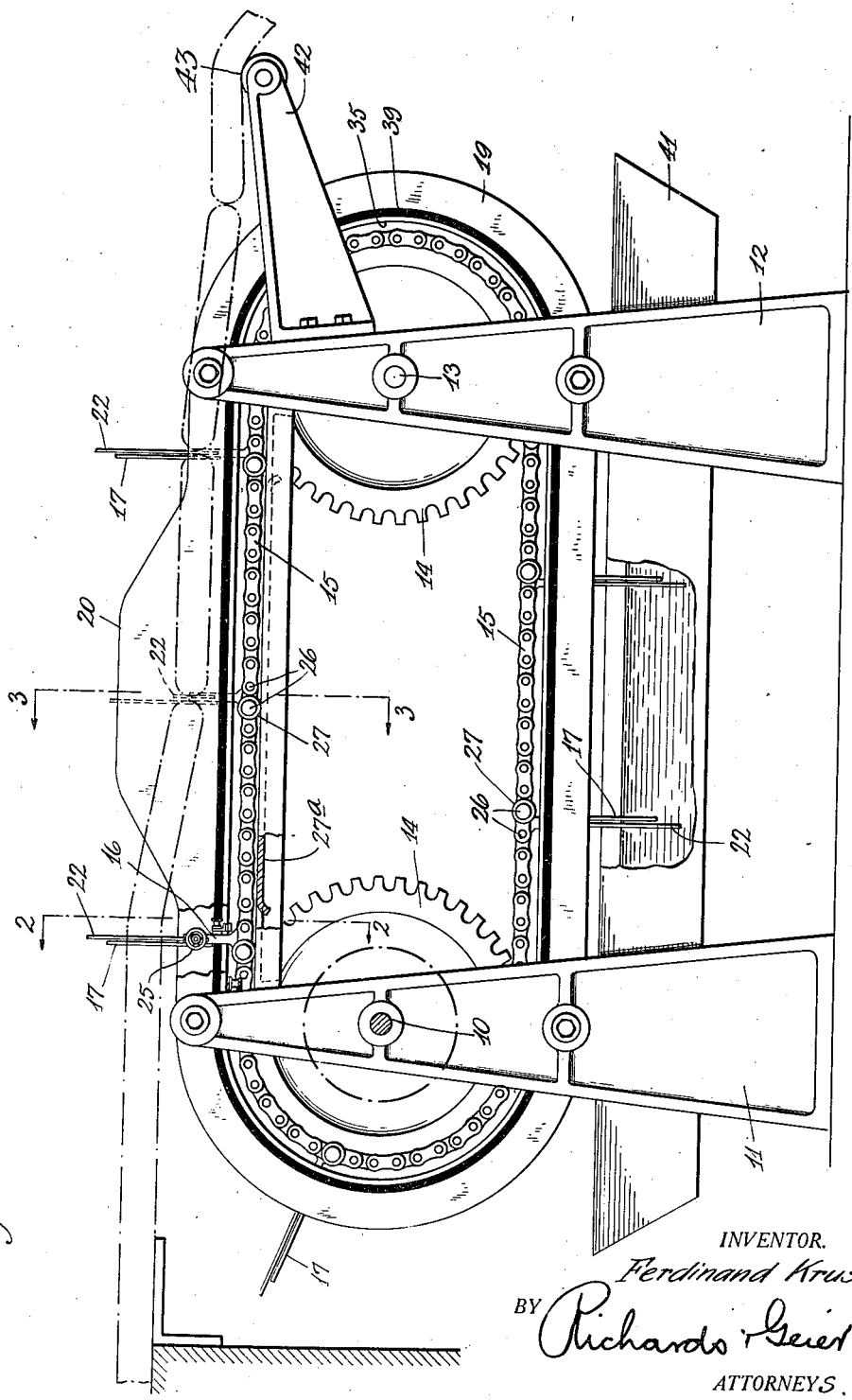

June 19, 1923.
F. KRUSE
1,459,069
METHOD AND MACHINE FOR FORMING SAUSAGES
Filed Feb. 19, 1923 3 Sheets-Sheet 2
*Fig. 2.*
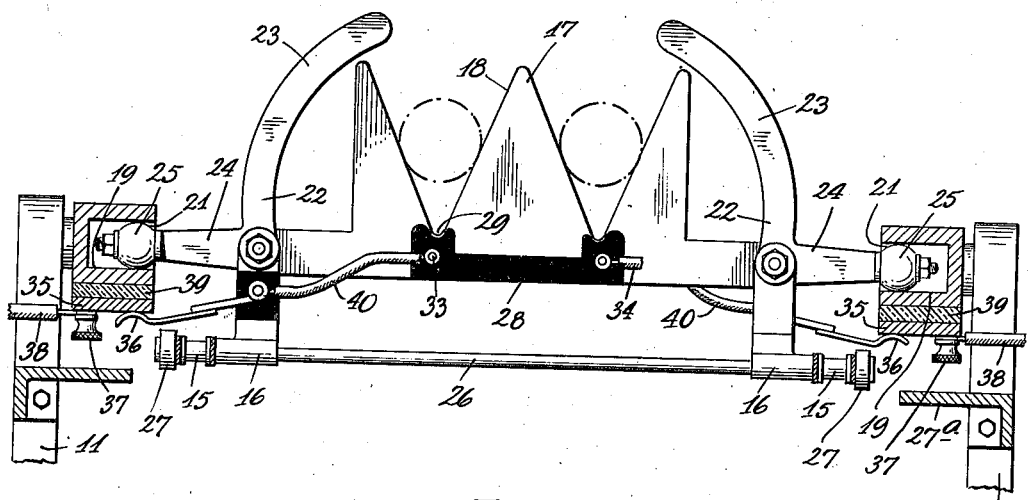
*Fig. 3.*
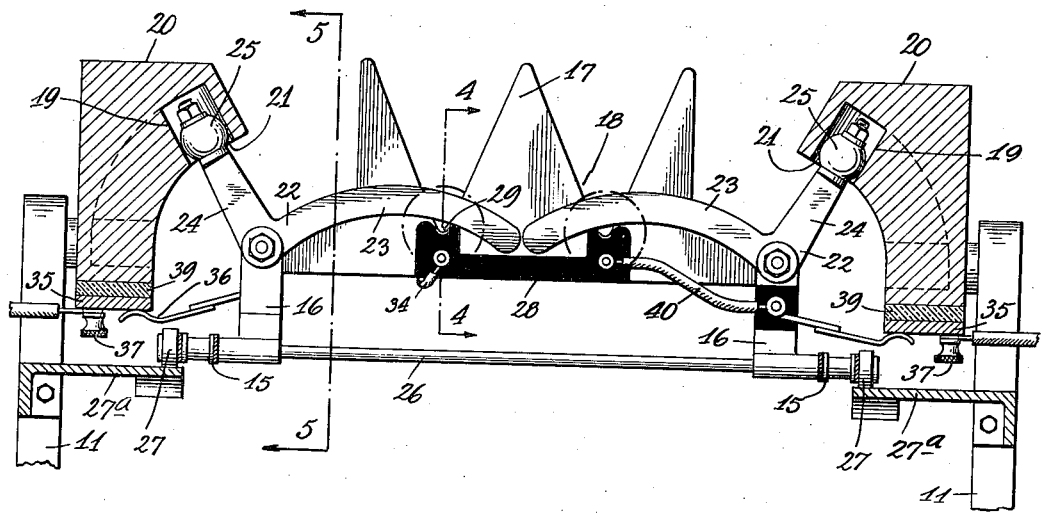
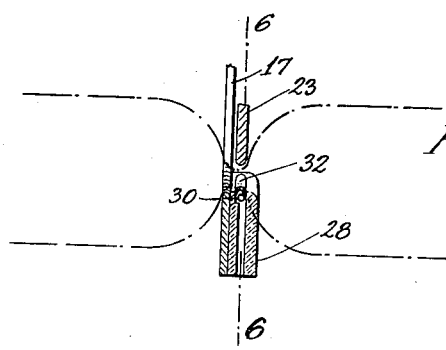
*Fig. 4.*
INVENTOR.
Ferdinand Kruse
BY
ATTORNEYS.

June 19, 1923.

F. KRUSE 1,459,069

METHOD AND MACHINE FOR FORMING SAUSAGES

Filed Feb. 19, 1923     3 Sheets-Sheet 3

INVENTOR.
Ferdinand Kruse
BY
Richards & Geier
ATTORNEYS.

Patented June 19, 1923.

1,459,069

UNITED STATES PATENT OFFICE.

FERDINAND KRUSE, OF PORT RICHMOND, NEW YORK.

METHOD AND MACHINE FOR FORMING SAUSAGES.

Application filed February 19, 1923. Serial No. 619,964.

*To all whom it may concern:*

Be it known that I, FERDINAND KRUSE, a citizen of the United States, residing at Port Richmond, county of Richmond, and State of New York, have invented certain new and useful Improvements in Methods and Machines for Forming Sausages, of which the following is a specification.

This invention relates to the linking of sausages and has for its object to provide a new method and a suitable apparatus for carrying out the method. Heretofore it has been the common practice to squeeze the casings at the desired points, and to twist the casing to secure it at the contracted places, the linking usually being performed by hand. While numerous attempts have been made to provide machines for supplanting the hand work, such machines have not been as a rule commercially successful due to the extreme thinness of the casings which are frequently unable to withstand the twisting strains placed upon them by the twisting belts and other devices which have been proposed, the casings breaking and disgorging their contents of chopped meat over the machines, thus necessitating great loss of time in cleaning the machine. I have found that the casings are greatly affected by heat, which when applied to the casings at any point causes an immediate permanent shrinking or constriction of the casing at the point where the heat is applied, therefore by squeezing the casings at the desired points and applying heat to the casings at these points, I am enabled by the effect of the heat to cause a permanent contraction of the casing at these points which obviates the necessity of twisting the casings.

For the carrying out of the method I have shown in the accompanying drawings and described in the following specification, a suitable form of an apparatus which may be employed, but it will be understood that the apparatus is to be considered merely as illustrative, as it will be apparent that many changes, variations and modifications in the apparatus may be resorted to which fall within the scope of the claims hereunto appended and without departing from the spirit of my invention.

In the drawings forming a part hereof:

Fig. 1 is a side elevation of a suitable form of apparatus for carrying out my new method.

Figs. 2 and 3 are cross sectional views on the lines 2—2 and 3—3 respectively of Fig. 1.

Figure 5:
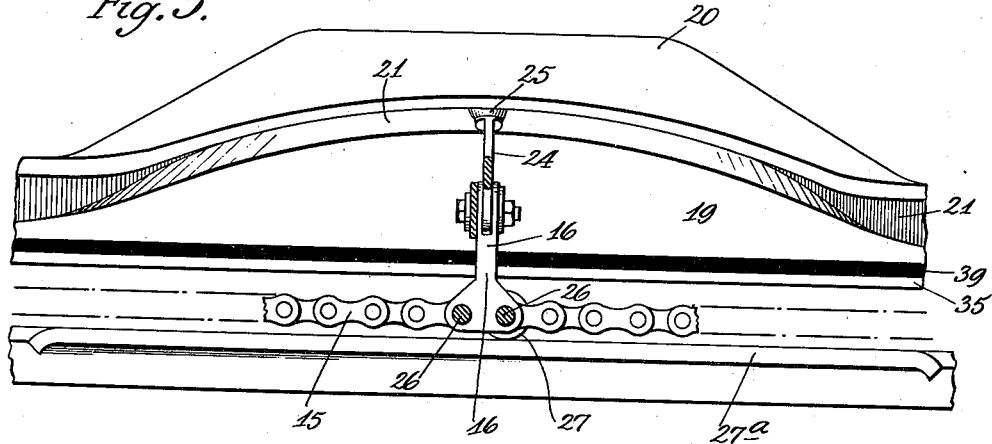

Figs. 4 and 5 are detail cross sectional views on the lines 4—4, and 5—5 respectively of Fig. 3.

Figure 6:
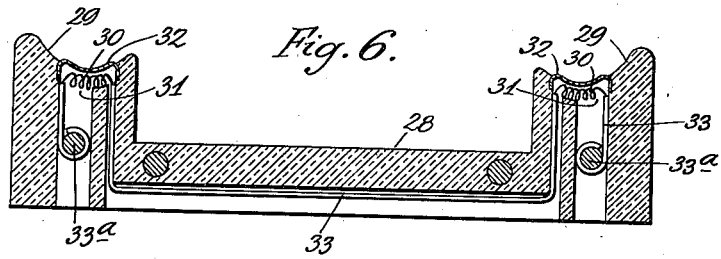
Figure 7:
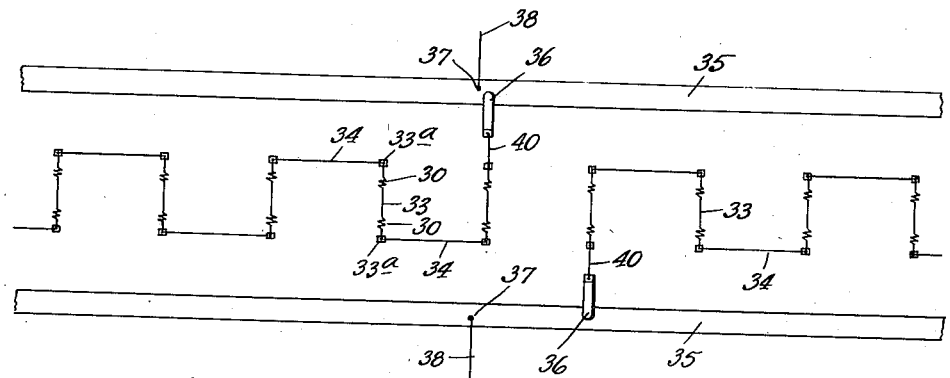

Fig. 6 is an enlarged detail cross sectional view on the line 6—6 of Fig. 4, and Fig. 7 is a diagrammatic view of the electrical wiring of the heating system.

As shown in the drawings, a shaft 10 is journaled in and extends between a pair of standards 11 situated at one end of the machine and spaced transversely thereof, while a pair of similar standards 12 located at the other end of the machine have a shaft 13 journaled therein. Secured to each of the shafts 10 and 13, adjacent to each of the standards is a sprocket 14, there being four of these sprockets provided, two upon each shaft in transversely spaced relationship upon the sprockets, one sprocket on each shaft, being in alignment longitudinally of the machine and cooperating with a companion sprocket on the other shaft to support and drive the conveyer chains 15.

Extending between the sprocket chains 15 and secured thereto as by the brackets 16, at suitably spaced intervals are a number of former elements 17, which are provided with the V shaped cut out portions 18 adapted to receive the sausage casings indicated diagrammatically by the dot and dash line in Figs. 1 to 4 inclusive.

On each side of the machine the cam races 19 are secured in any suitable manner to the standards and each cam race is provided substantially at the central portion of its upper length with an upwardly projecting extension 20, the cam races and extensions being provided with a continuous cam groove 21.

Pivotally mounted on each of the brackets 16 is a swinging former element 22 having its inner arm 23 of arcuate shape and its outer arm 24 extending at an inclination to the inner arm. The outer arms 24 of each of the swinging former elements extend into the cam grooves 21 and are provided with an anti-friction or cam roller 25, which engages the sides of the cam groove to cause the swinging formers to be moved from the positions shown in Fig. 2 to the positions shown in Fig. 3 as the chains are rotated.

Mounted in the brackets 16 and extending transversely across the machine are the shafts 26 which project outwardly beyond the conveyer chains and are provided at their outer extremities with the rollers 27. Tracks 27ª secured to the inner faces of the standards 11 and 12, project under the upper reaches of the conveyer chains and coöperates with the rollers 27 and shafts 26 to prevent sagging of the upper reaches of the chains and distortion thereof by the action of the swinging formers.

Any suitable means may be provided to apply heat to the casings after they have been squeezed by the formers and a preferred embodiment of such means as shown consists of a block 28 of insulating material secured to each of the former elements 17. Each of these blocks is provided with a small recessed portion 29 in alignment with the base of each of the V-shaped cut outs 18 of the formers 17 and a small heating unit is set into the recessed portion 29. The heating unit may be constructed in any desirable manner but is shown as consisting of a coil 30 of high electrical resistance seated within a groove 31 in the block 28 which coil is covered by a thin plate 32 to prevent direct contact of the sausage casings with the coil. The insulating blocks 28 are provided with suitable channels to permit the passage of the inner connecting wires 33 from one heating coil to another. Suitable binding posts 33ª are also provided for connecting the ends of the wires 32 and for the outer connecting wires 34 by means of which the heating units are connected in series.

Secured along the inner face of each of the cam tracks 19 is a contact ring 35 with which is adapted to engage the two spring contacts 36 one of which is mounted upon one of the brackets 16 upon the left hand conveyer chain (Figs. 2 and 3) and the other of which is mounted upon one of the brackets 16 of the other or right hand conveyer chain. Each of the contact rings is connected as by binding posts 37 and lead wires 38 with any convenient source of electricity and suitable insulation as indicated by the numeral 39 is provided between the contact rings 35 and the cam races 19.

As shown in Fig. 7 the coils 30 are connected in series, the current passing through one contact ring 35 to a spring contact 36, from which it is led through the connecting wire 40 to one of the binding posts 33, through the inner connecting wires 32, coils 32 and outer connecting wires 34, freely passing out through the other spring contact 36 and cam track 35 to the line.

Any suitable means may be provided for rotating the shaft 10, either by power or by manual means. A trough 41 adapted to be filled with water is secured to the standards 11 and 12, in such a position as to cause the former elements to dip into the water and be cooled, thereby as the conveyer chains are rotated.

Brackets 42 are secured to the standards 12 and a roller 43 is rotatably mounted between said brackets over which roller the linked sausages are led from the former elements to any suitable receiving means.

The method is carried out by the machine as follows, the machine is placed adjacent a suitable work bench containing the unlinked sausage casings, which are placed between the V shaped cut outs of the former elements 17, the machine is started and the casings are carried through the machine as the conveyer chains rotate the swinging former elements 22 are moved from the positions shown in Fig. 2, to those shown in Fig. 3, through the shape of the cam groove 21, in the extension 20 in a manner that will be readily understood.

As the former elements 22 are swung downwardly the arcuate arms 23 will coöperate with the V shaped formers to compress the casings into spaced links, and when the arms 23 have reached the downward limit of their travel, the casings will be squeezed against the heating units 30 thus causing an immediate and permanent contraction of the casings at these points by reason of the effect of the heat. The former elements 17 and 22 are constructed and arranged to compress only a narrow portion of the casing and to squeeze substantially all of the chopped meat away from this portion so that when the swinging formers have reached the positions shown in Fig. 3, there will be practically no chopped meat between the inner faces of the casing at this narrow portion, the heat communicated to the lower half of the circumference of the squeezed portion of the casing is communicated directly through and across the casing to the upper half of this narrow portion with the result that a narrow annular permanently contracted ring is formed which is not released thereafter by steam, moisture or heat.

It is essential that the heat is not applied to the casings until they have been completely squeezed otherwise they would be broken or split consequently the former elements 17 should be kept in a cool condition. For this purpose the insulating blocks must be constructed of a heat as well as an electrical insulating material and as a further safeguard aganst undesirable heating of the former elements 17 and 22, the water trough 41 has been provided into which the former elements dip as the conveyer chains are rotated.

While I have illustrated and described electrical heating units, it will be obvious that the hot water, steam or any other form of heating means may be used and that the method of securing the casings into links by heat could be carried out by many different forms of apparatus or by manual or hand tools.

Having thus described my invention, what I claim as new and desire to secure by Letters Patent, is:—

1. The method of forming a sausage casing into links which consists in compressing the casings at spaced intervals and applying heat thereto at said intervals to contract the casing and thereby secure it in linked form.

2. The method of forming a sausage casing into links which consists in compressing the casings at selected points and applying heat thereto at said points only to contract the casing and secure it in linked form.

3. The method of forming a sausage casing into links which consists in compressing a narrow annular portion of said casing at selected points and applying heat along said annular portion to cause said portion to form a permanently contracted band to secure said casing into links.

4. The method of forming a sausage casing into links which consists in squeezing said casing to form a narrow annular contracted portion from which substantially all the chopped meat has been compressed and applying heat to said annular portion to secure it in a substantially permanently contracted condition.

5. An apparatus for forming a sausage casing into links comprising means to compress said casing at selected intervals to space it into links and means adjacent said compressing means for applying heat to said casing.

6. An apparatus for forming sausages into links comprising means for squeezing said sausages at selected intervals to space it into links, means for heating said casing at said intervals only and means for preventing conduction of said heat from said heating to said squeezing means.

7. An apparatus for forming sausages into links comprising means for squeezing said sausages at selected intervals to space it into links, means for heating said casing at said intervals only, means for preventing conduction of said heat from said heating to said squeezing means, and means for cooling said squeezing means.

8. An apparatus for forming sausages into links comprising means for squeezing said sausages at selected intervals to space it into links, means for heating said casing at said intervals only, means for preventing conduction of said heat from said heating to said squeezing means, said squeezing and heating means being constructed and arranged to prevent the application of heat to said casings until said squeezing operation is completed.

9. A machine for forming a sausage casing into links comprising a conveyer, squeezing means carried by said conveyer, means adjacent said conveyer to cause said squeezing means to be actuated to squeeze said casing into links as it is passing through the machine, and means for applying heat to the squeezed portion of said casing to secure it in linked condition.

10. A machine for forming sausage casings into links comprising a conveyer having upper and lower reaches, former elements carried by said conveyer, means to cause said former elements to squeeze said casing at selected intervals to space it into links while said former elements are traveling along the upper reach of said conveyer, means to apply heat to said sausage casings momentarily to said casings at the squeezed portions thereof and means to cool said former elements while they are traveling along the lower reach of said conveyer.

11. A machine for forming sausage casings into links comprising a conveyer, means to squeeze said casings at selected intervals to space it into links, said means comprising former elements, one of which is pivotally mounted with respect to the other, means to actuate said pivotally mounted former element during a portion of the travel of said conveyer to cause it to squeeze said casing and means to apply heat to the squeezed portion of said casing.

12. A machine for forming sausage casings into links comprising a conveyer, means to squeeze said casing at selected intervals to space it into links, said means comprising former elements, one of which is pivotally mounted with respect to the other, means to actuate said pivotally mounted former element during a portion of the travel of said conveyer to cause it to squeeze said casing and means to apply heat to the squeezed portion of said casing, and means to cool said former elements during another portion of the travel of said conveyer.

13. A machine for forming sausage casings into links comprising a conveyer, means to squeeze said casing at selected intervals to space it into links, said means comprising former elements, one of which is pivotally mounted with respect to the other, a cam race by which said pivotally mounted former element is actuated, said cam race constructed and arranged to cause said pivotally mounted former element to engage and squeeze said casing during a portion of the travel of said conveyer and to be disengaged from said casing during the remainder of the travel of said conveyer.

14. A machine for forming sausage casings into links comprising a conveyer, means to squeeze said casing at selected intervals to space it into links, said means comprising former elements, one of which is pivotally mounted with respect to the other, a cam race by which said pivotally mounted former element is actuated, said cam race constructed and arranged to cause said pivotally mounted former element to engage and squeeze said casing during a portion of the travel of said conveyer and to be disengaged from said casing during the remainder of the travel of said conveyer, and means to heat the squeezed portions of said casing.

15. A machine for forming sausage casings into links comprising means for squeezing said casings at selected intervals to space them into links and means for heating the squeezed portions of said casing, said squeezing means and heating means being constructed and arranged to cause said casings to be brought momentarily into contact with said heating means and only after substantially all of the chopped meat has been removed from said squeezed portion.

16. A machine for forming sausage casings into links comprising a pair of spaced conveyer chains, former elements secured to and extending between said chains, said former elements provided with cut out portions adapted to receive the sausage casing pivotally mounted former elements juxtaposed to said first named former elements, means to cause said pivotally mounted former elements to squeeze said casing into said cut out portions to space said casings into links and means to apply heat to the squeezed portions of said casings to secure them in linked condition.

17. A machine for forming sausage casings into links comprising a pair of spaced conveyer chains, former elements secured to and extending between said chains, said former elements provided with cut out portions adapted to receive the sausage casing, pivotally mounted former elements juxtaposed to said first named former elements, means to cause said pivotally mounted former elements to squeeze said casing into said cut out portions to space said casings into links and heating means carried by said first named former elements adjacent the base of said cut out portions.

18. A machine for forming sausage casings into links comprising a pair of spaced conveyer chains, former elements secured to and extending between said chains, said former elements provided with cut out portions adapted to receive the sausage casing, pivotally mounted former elements juxtaposed to said first named former elements, means to cause said pivotally mounted former elements to squeeze said casing into said cut out portions to space said casings into links, heating means carried by said first named former elements adjacent the base of said cut out portions, and means to insulate said heating means from said former elements.

19. A machine for forming sausage casings into links comprising a pair of spaced conveyer chains, former elements secured to and extending between said chains, said former elements provided with cut out portions adapted to receive the sausage casing, pivotally mounted former elements juxtaposed to said first named former elements, means to cause said pivotally mounted former elements to squeeze said casing into said cut out portions to space said casings into links, said means comprising a cam race adjacent said conveyer chains and constructed and arranged to cause said pivotally mounted former elements to compress said casing during a portion of the travel of said conveyer chains.

20. A machine for forming sausage casings into links comprising a pair of spaced conveyer chains, former elements secured to and extending between said chains, said former elements provided with cut out portions adapted to receive the sausage casing, pivotally mounted former elements juxtaposed to said first named former elements, means to cause said pivotally mounted former elements to squeeze said casing into said cut out portions to space said casings into links, said means comprising a cam race adjacent said conveyer chains cooperating with and constructed and arranged to cause said pivotally mounted former elements to compress said casing during a portion of the travel of said conveyer chains and means to cool said former elements during another portion of the travel of said conveyer chains.

21. The method of forming sausage casings into links which consists in squeezing the casings at selected points to space them into links and momentarily applying heat to said casings only at the squeezed portions thereof to permanently contract the squeezed portions and secure it in linked condition.

In testimony whereof I have affixed my signature.

FERDINAND KRUSE.